INVENTOR
STEPHAN J. KISSH

Oct. 2, 1962     S. J. KISSH     3,056,601
HOUSING SEAL FOR ROTARY FOLDING CYLINDER
Filed July 12, 1961     2 Sheets-Sheet 2
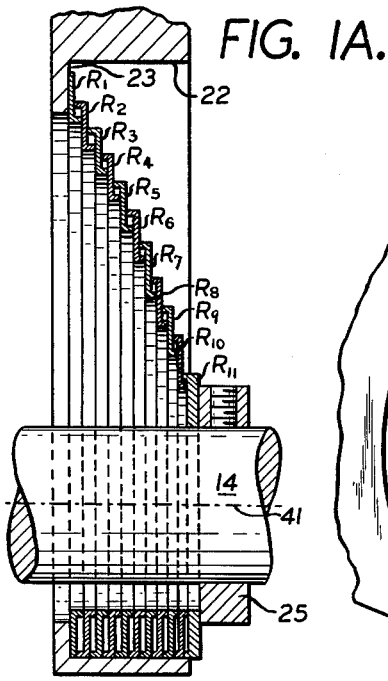
FIG. 1A.
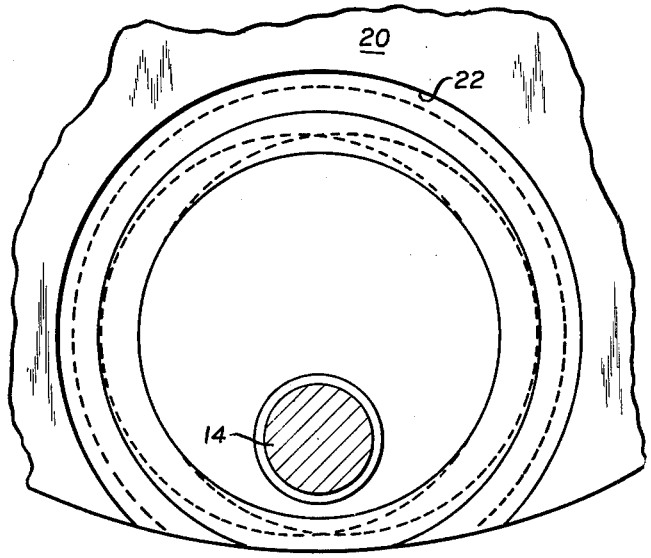
FIG. 2.
FIG. 5.
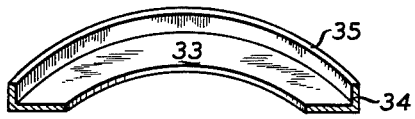
FIG. 4.
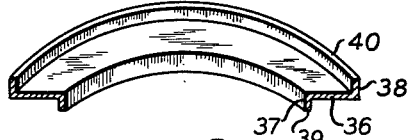
FIG. 3.
INVENTOR
STEPHAN J. KISSH
BY
ATTORNEYS

United States Patent Office 3,056,601
Patented Oct. 2, 1962

3,056,601
HOUSING SEAL FOR ROTARY FOLDING CYLINDER
Stephan J. Kissh, Flushing, N.Y., assignor to R. Hoe & Co., Inc., Bronx, N.Y., a corporation of New York
Filed July 12, 1961, Ser. No. 123,558
4 Claims. (Cl. 270—70)

This invention relates to seals for rotating elements. More particularly, the invention is concerned with the provision of a seal for retaining oil within a housing, involving sealing between relatively eccentric rotating members such as a cylinder and folding blade shaft in a printing press folding mechanism.

The general object of the invention is to provide a seal of the type indicated which does not require accurate location or position of parts or the use of resilient sealing members and provides for sealing between members with comparatively high relative rotary speeds without development of excessive friction due to high speed sliding movement between adjacent sealing members.

With this and other objects which will appear in the following full description in mind, the invention consists in the combination and arrangement of parts and details of construction which will now be fully described with reference to the accompanying drawing, and then be more particularly pointed out in the appended claims.

In the drawing:

FIG. 1A is an enlarged view of a portion of FIG. 1;

FIG. 2 is a somewhat schematic section on the general line 2—2 of FIG. 1; and

FIGS. 3, 4 and 5 are isometrics, partly broken away, showing the structure of sealing ring elements utilized in the seal.

Figure 1:
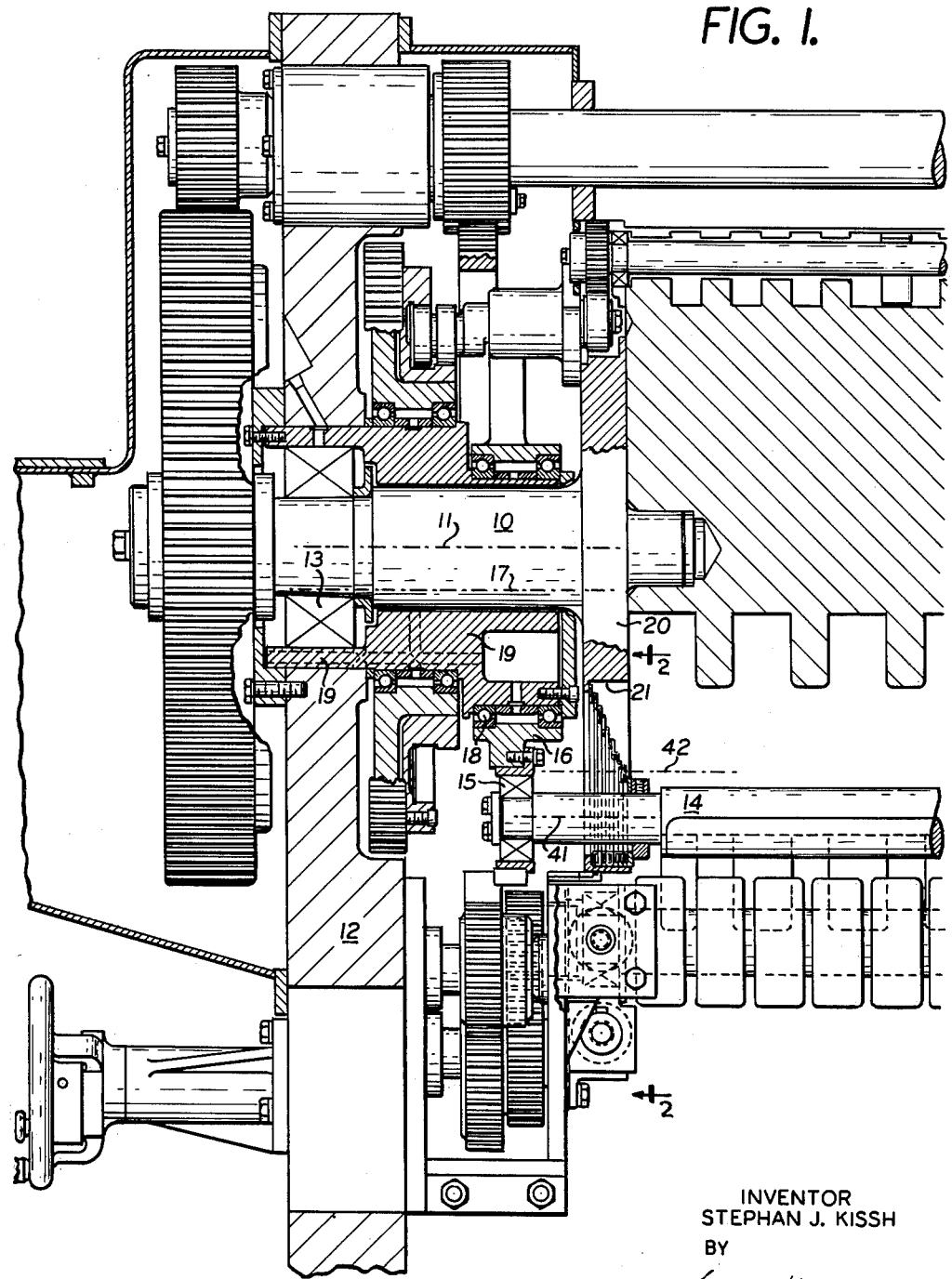
FIG. 1 is an axial section of a sealing mechanism embodying the invention in a preferred form.

The elements to be sealed together comprise a folding cylinder shaft 10 rotatable about the axis 11 and supported in a frame 12 by bearings indicated schematically at 13, on the one hand, and folding blade shafts 14 rotatably carried by means of bearings 15 on a member 16, this member rotating about an axis indicated at 17 and being supported by bearings 18 on a bushing 19 which is, in turn, supported from the frame 12, and supports the bearing 13 therein. As will be understood by those skilled in the art, the folding blade carrier has a plurality, generally two or three, of folding blade shafts 14 rotatably carried in it, and means for rotating the cylinder, folding blade carrier and folding blades in proper timed relation is provided. This mechanism forms no part of the present invention and may take any usual form such as shown, for example, in prior patents and applications.

Fixed to the shaft 10, or formed therewith, is a disc 20 forming part of an oil housing (to the left in the drawing). The disc 20 has a bore 21 for each folding blade, the folding blade shaft passing through this bore as indicated in the drawing, the bore (FIG. 1A) having a generally cylindrical inner surface 22 and a radial flange forming a radial sealing surface 23 at one edge of the surface 22. Secured to the folding blade shaft 14 is a collar 25 slightly spaced from the face of disc 20, this collar and the surface 23 previously referred to, serving to locate the sealing arrangement about to be described.

The assembly comprises a succession of annular rings R–1—R–11. The ring R–1 lies against the surface 23 as indicated in the drawing, and has the configuration shown in FIG. 3, having the shape of a generally annular plate or washer 30 with an inner axially extending flange 31 terminating in a bearing surface 32. The ring R–11 (FIG. 5) is similar in construction to the ring R–1, having the general form of an annular plate or washer 33 with an outer cylindrical axial flange 34 terminating in a bearing surface 35. The structure of the rings R–2—R–10 is similar, each of these rings, as indicated in FIG. 4, having the form of an annular plate or washer 36 with oppositely facing inner and outer cylindrical flanges 37 and 38 terminating in bearing surfaces 39 and 40. The axis 41 of shaft 14 (in the position of the figure) is spaced from the axis 42 of bore 21 by a distance substantially equal to the spacing between folding cylinder and blade carrier axes 11, 17.

As the mechanism rotates, the cylinder shaft 10 and the member 16 rotating at the same number of revolutions per minute, it will be apparent that any folding blade shaft 14 will move relative to disc 20 from an outermost position, such as indicated in FIG. 1, where its axis 41 is spaced from the axis 42 of bore 21 by the same spacing as between axes 11 and 17, to an innermost position as indicated at 41' where the same spacing of axes exists, but in the opposite radial direction. As will also be apparent, since the folding blade axis 41 is rotating in a circular path about axis 17 eccentric to the axis 11 about which the bore axis 42 is also rotating, there will be a slight angular displacement of these two elements as well as the larger radial movement which has been mentioned. Sealing washers R–1—R–11 provide for maintaining a seal under these conditions of relative movement while avoiding excessive sliding movements. Relative to the disc 20, folding blade shaft 14 may have either of two general rotary movements on its axis 41, depending upon whether the run is straight or collect. In the one case, the shaft 14 may make a retrograde rotation for each rotation of the disc 20, and in the other, it may make a half such rotation for each rotation of the disc 20, so that the rotary speed of shaft 14 with respect to disc 20 is essentially equal to the rotation speed of the mechanism as a whole.

Each of the washer plates R–1—R–11 is free to slide transversely of the axis of rotation of shaft 14 and also free to rotate about its own axis. In consequence, the first washer plate R–1 may be practically stationary with respect to the disc 20, while the last washer plate R–11 may be practically stationary with respect to the collar 25, the successive washer plates R–1—R–11 rotating relative to each other with an average rotary speed between each pair of adjacent plates of about 10% of the rotary speed of the mechanism. A generally annular space is defined between flange 31 of the washer plate R–1 and flange 37 of adjoining washer plate R–2 and a similar annular space is defined between the flanges of each other pair of adjacent washer plates. The total volume of such space is constant, permitting the maintenance of lubricating oil within these spaces. Inasmuch as each washer plate R–1—R–11 is revolving about the axis 11, 17 or some intermediate axis, each plate is subjected to centrifugal force, positioning the various washer plates by means of their flanges. The contact between the washer plates and the cylindrical surface 22 of bore 21 is confined, as is apparent, to non-sealing portions of the plates, and the clearance between the outer rim of washer R–1 and the bore 21 need only be sufficient so as to provide for the necessary circumferential movement between the parts, which movement is, as pointed out before, slight by comparison with the radial movement of the elements.

What is claimed is:

1. In a folding mechanism having a folding cylinder body, a folding blade carrier, means mounting the body and carrier for rotation about eccentric axes and driving them at equal angular speeds about their respective axes, folding blade shafts rotatably carried by the carrier, gearing for driving the folding blade shafts and housing means for the gearing comprising a housing wall member fixed to and rotatable with the cylinder body and having apertures through which the folding blade shafts pass, the combination with the said housing wall member and a folding blade shaft of a sealing mechanism comprising a nest of flat annular washer plates of graduated diameters, disposed in planes at right angles to the folding blade shaft axis, each said plate having an inner rim flange sealing against the adjacent smaller diameter plate and an outer rim flange sealing against the adjacent larger diameter plate, the inner diameter of each said outer rim flange being greater than the outer diameter of the inner rim flange of the adjacent larger diameter plate whereby rotary and radial sliding movement of each plate with respect to the adjacent plates is permitted, means sealing the larger terminal plate of the nest to the said housing wall and holding it axially against its adjacent plate of the nest and means sealing the smaller terminal plate of the nest to the folding blade shaft and holding it axially against its adjacent plate.

2. The combination according to claim 1, in which the radial spacing between the respective inner and outer rim flanges of adjacent plates is such as to permit aligning the peripheries of the said plates along a common line when the axis of the folding blade shaft is at its greatest distance from the cylinder body axis and comprising also abutment means for supporting the said plates in such aligned position.

3. The combination according to claim 2, in which the said abutment means comprises a cylindrical bore surface formed in the housing wall and accommodating the said nest of plates.

4. In a folding mechanism having a folding cylinder body, a folding blade carrier, means mounting the body and carrier for rotation about eccentric axes and driving them at equal angular speeds about their respective axes, folding blade shafts rotatably carried by the carrier, gearing for driving the folding blade shafts and housing means for the gearing comprising a housing wall member fixed to and rotatable with the cylinder body and having apertures through which the folding blade shafts pass, the combination with the said housing wall member and a folding blade shaft of a sealing mechanism comprising a nest of flat annular washer plates of graduated diameters, disposed in planes at right angles to the folding blade shaft axis, each said plate having an inner rim flange sealing against the adjacent smaller diameter plate and an outer rim flange sealing against the adjacent larger diameter plate, the inner diameter of each said outer rim flange being greater than the outer diameter of the inner rim flange of the adjacent larger diameter plate whereby rotary and radial sliding movement of each plate with respect to the adjacent plates is permitted, the said housing wall member having a cylindrical bore accommodating the said nest of plates, an annular plate member within the said bore and engaging the larger terminal plate of the said nest in sealing relation thereto and a washer plate fitting the said shaft and engaging the smaller terminal plate of the said nest.

No references cited.